United States Patent
Patel et al.

(10) Patent No.: US 7,873,025 B2
(45) Date of Patent: Jan. 18, 2011

(54) NETWORK DEVICE THAT DETERMINES APPLICATION-LEVEL NETWORK LATENCY BY MONITORING OPTION VALUES IN A TRANSPORT LAYER MESSAGE

(75) Inventors: Alpesh S. Patel, Pleasanton, CA (US); Syam Sundar V. Appala, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 837 days.

(21) Appl. No.: 11/361,392

(22) Filed: Feb. 23, 2006

(65) Prior Publication Data

US 2007/0195797 A1    Aug. 23, 2007

(51) Int. Cl.
*H04J 3/06*    (2006.01)
(52) U.S. Cl. .................................. 370/350; 370/503
(58) Field of Classification Search .............. 370/229, 370/230, 233, 253, 498, 503; 375/225, 224
See application file for complete search history.

(56) References Cited

U.S. PATENT DOCUMENTS

| | | | | |
|---|---|---|---|---|
| 5,802,106 | A * | 9/1998 | Packer | 375/225 |
| 6,421,319 | B1 * | 7/2002 | Iwasaki | 370/230 |
| 2005/0071446 | A1 * | 3/2005 | Graham et al. | 709/223 |
| 2006/0239300 | A1 * | 10/2006 | Hannel et al. | 370/503 |

OTHER PUBLICATIONS

Information Sciences Institute, University of Southern California, "Transmission Control Protocol: DARPA Internet Program Protocol Specification," Internet Engineering Task Force (IETF) Request for Comments (RFC) 793, Sep. 1981, pp. 1-88.
V. Jacobson et al., "TCP Extensions for High Performance," IETF RFC 1323, May 1992, pp. 1-35.
C. Kalbfleisch et al., "Application Management MIB," IETF RFC 2564, May 1999, pp. 1-81.
M. Lacy, "Remote Timing Techniques," downloaded Sep. 28, 2005 from the Internet location "http://www.maurol.com.ar/security/rtt.pdf," pp. 1-8.

* cited by examiner

*Primary Examiner*—Phuc Tran
(74) *Attorney, Agent, or Firm*—Hickman Palermo Truong & Becker LLP

(57) ABSTRACT

A data processing apparatus in a network receives packet flows that are communicated between a first network node and a second network node, and comprises a clock and latency analysis logic configured for receiving a first data segment that has been communicated from the first node and forwarding the first data segment to the second node; storing a first time value of the clock in association with a first timestamp value obtained from the first data segment; receiving a second data segment that has been communicated from the second node and forwarding the second data segment to the first node; retrieving the first time value based on the first timestamp value; determining a second time value of the clock; and determining a first latency value by computing a difference of the second time value and the first time value. Thus end-to-end packet latency is determined by passively observing timestamp values.

25 Claims, 4 Drawing Sheets

NETWORK DEVICE THAT DETERMINES APPLICATION-LEVEL NETWORK LATENCY BY MONITORING OPTION VALUES IN A TRANSPORT LAYER MESSAGE

FIELD OF THE INVENTION

The present invention generally relates to network data communications. The invention relates more specifically to techniques for determining application layer network latency that messages experience from end to end of a transport layer network connection.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks comprising end stations and infrastructure elements, such as routers, switches, and bridges, benefit from management and monitoring. In a packet-switched network that uses Internet Protocol (IP) and Transmission Control Protocol (TCP), an essential management function is monitoring the amount of time required to transmit data from one point in the network to another point in the network. The time required for a data packet to move from an origination point to a destination point, and to receive a response packet from an application at the destination point, is sometimes termed "round-trip time" (RTT). Delays that packets encounter in traversing such a path are sometimes termed "latency."

Computer application software programs ("applications") often use TCP as a transport protocol because TCP provides reliable and ordered delivery of messages. TCP is defined in documents published by the Internet Engineering Task Force, including, for example, IETF Request for Comments (RFC) 793 (1981). The reliability of TCP is favored in financial systems; for example, applications providing order execution, status reporting, and market data are commonly based upon TCP.

The network administrators at financial service providers, such as investment banks and brokerages, desire to have information indicating the performance of the networks of the financial service providers. Such networks are sometimes owned and operated by network service providers who enter into a service level agreement with the financial service providers. The service level agreement specifies minimum expected performance metrics that the network service provider is expected to meet.

In this context, the network administrators of the financial service providers are interested in having network performance data that can be used to verify whether the performance metrics are being met in actual network operation.

IETF RFC 1323 (1992) defines a "timestamp option" for TCP. When a network element uses the timestamp option, that network element inserts a timestamp value into each TCP segment that the network element sends to another TCP endpoint. The timestamp value represents an approximate time at which the TCP segment was formed or dispatched.

The TCP timestamp option is intended to provide a way for TCP endpoints to monitor the amount of time that a packet takes to traverse from one endpoint to another endpoint for the purpose of adjusting back-off values or other parameters. In practice, the TCP timestamp option is inaccurate, because the clocks of the TCP endpoints are almost never synchronized or are subject to clock drift and other errors. While clock synchronization protocols exist, a particular TCP endpoint seeking to connect to another endpoint is never assured that the other endpoint is using the synchronization protocol. Clock synchronization protocols also add network traffic overhead and are not widely deployed.

Further, even if a sending TCP endpoint is configured to use the timestamp option, the receiving TCP endpoint may be configured not to use the timestamp option. Therefore, in practice the TCP timestamp option does not provide a reliable mechanism to measure end-to-end latency. An improved method to measure end-to-end latency is needed.

Still another problem with existing approaches is that they do not provide a way to determine latency or delay at the application or socket level. In past practice the TCP timestamp option has been monitored only within a TCP module. Such monitoring ignores the impact of latency from moving packets from the TCP module up the network stack to an application, application processing delays, and latency moving packets back down from the application to the TCP stack. The error is doubled because such an impact is ignored in both endpoints of a connection. Thus, mere use of TCP timestamps in conventional practice in a TCP layer does not give an accurate view of all latency that an application experienced. IETF RFC 2564 provides an application management information base (MIB) for network elements that use simple network management protocol (SNMP), but RFC 2564 does not provide a way to measure end-to-end delay.

Prior practice also has not allowed for rapid or real-time analysis of latency issues. TCP timestamps could be written to a log and subjected to later log analysis, but such analysis usually occurs far too late to address network problems that caused the latency. An approach is needed that allows a network administrator to detect high latency and address network problems at about the same time as latency issues are detected.

Network infrastructure elements such as routers and switches are sometimes operated in a so-called "promiscuous mode" in which a first network element is logically interposed between and monitors traffic originating from a second network element and directed toward a third network element. In promiscuous mode, the first network element examines packets that move from the second network element to the third network element, but the first network element does not delay or modify the packets. The first network element can report a copy of the observed traffic, data signatures of observed packets, or control plane events communicated between the second and third network elements, to a management station or a monitoring entity. By monitoring packets in both directions, the first network element can report bidirectional latency.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
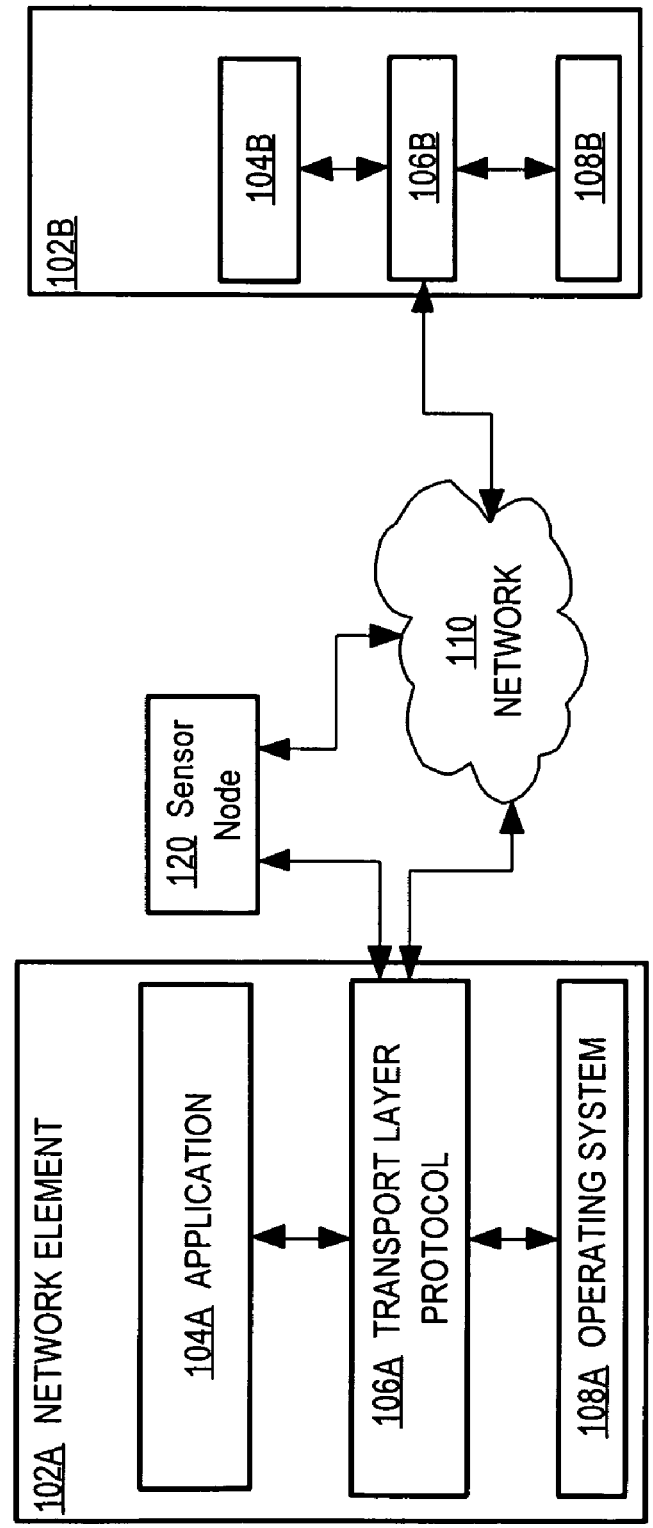
FIG. 1 is a block diagram of an example network arrangement in which an embodiment can be used.

A method and apparatus for determining application-level network latency by monitoring option values in a transport layer message are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Determining Application-Level Network Latency by Monitoring Option Values in a Transport Layer Message
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a data processing apparatus in a network that receives packet flows that are communicated between a first network node and a second network node, and comprises a clock and latency analysis logic configured for receiving a first data segment that has been generated by an application hosted on a transport layer protocol and communicated from application and transport layer protocol of the first node and forwarding the first data segment to the second node; storing a first time value of the clock in association with a first timestamp value obtained from the first data segment; receiving a second data segment that has been communicated from the second node and forwarding the second data segment to the first node; retrieving the first time value based on the first timestamp value; determining a second time value of the clock; and determining a first latency value by computing a difference of the second time value and the first time value. Thus end-to-end packet latency is determined by passively observing timestamp values.

In one feature of this aspect, the apparatus is logically located in a local area network (LAN) segment that contains the first node. In another feature, the data segments are transport control protocol (TCP) data segments, and wherein the timestamp values are in TCP timestamp option fields. In a related feature, the second data segment comprises a TCP acknowledgment bit set and a timestamp echo reply (TSecr) value equal to the first timestamp value.

In another feature, the latency analysis logic is configured for receiving a third data segment that has been communicated from the second node to the first node; storing a third time value of the clock in association with a third timestamp value obtained from the third data segment; receiving a fourth data segment that has been communicated from the first node to the second node; retrieving the third time value based on the third timestamp value; determining a fourth time value of the clock; determining a second latency value by computing a difference of the fourth time value and the third time value; and determining an end-to-end latency value as: ((first latency value+second latency value)/2).

In still another feature, the latency analysis logic does not alter the first data segment or the second data segment. In yet another feature, the latency analysis logic is configured for reporting any of the first latency value, the second latency value, and the end-to-end latency value to a network management element while the first node and the second node communicate subsequent data segments.

In yet another feature, the apparatus is logically located on a network access switch that services the first node and wherein the apparatus is logically located within a VLAN that contains the first node.

In other aspects, the invention encompasses a data packet router, a machine-implemented method and a computer-readable medium configured to carry out steps to implement the foregoing features.

2.0 Structural and Functional Overview

FIG. 1 is a block diagram of an example network arrangement in which an embodiment can be used. A first network element 102A is communicatively coupled through a network 110 to a second network element 102B. Network elements 102A, 102B may be end stations, such as workstations, personal computers, or mobile devices, or may comprise network infrastructure elements such as routers, switches, bridges, etc.

Figure 2:
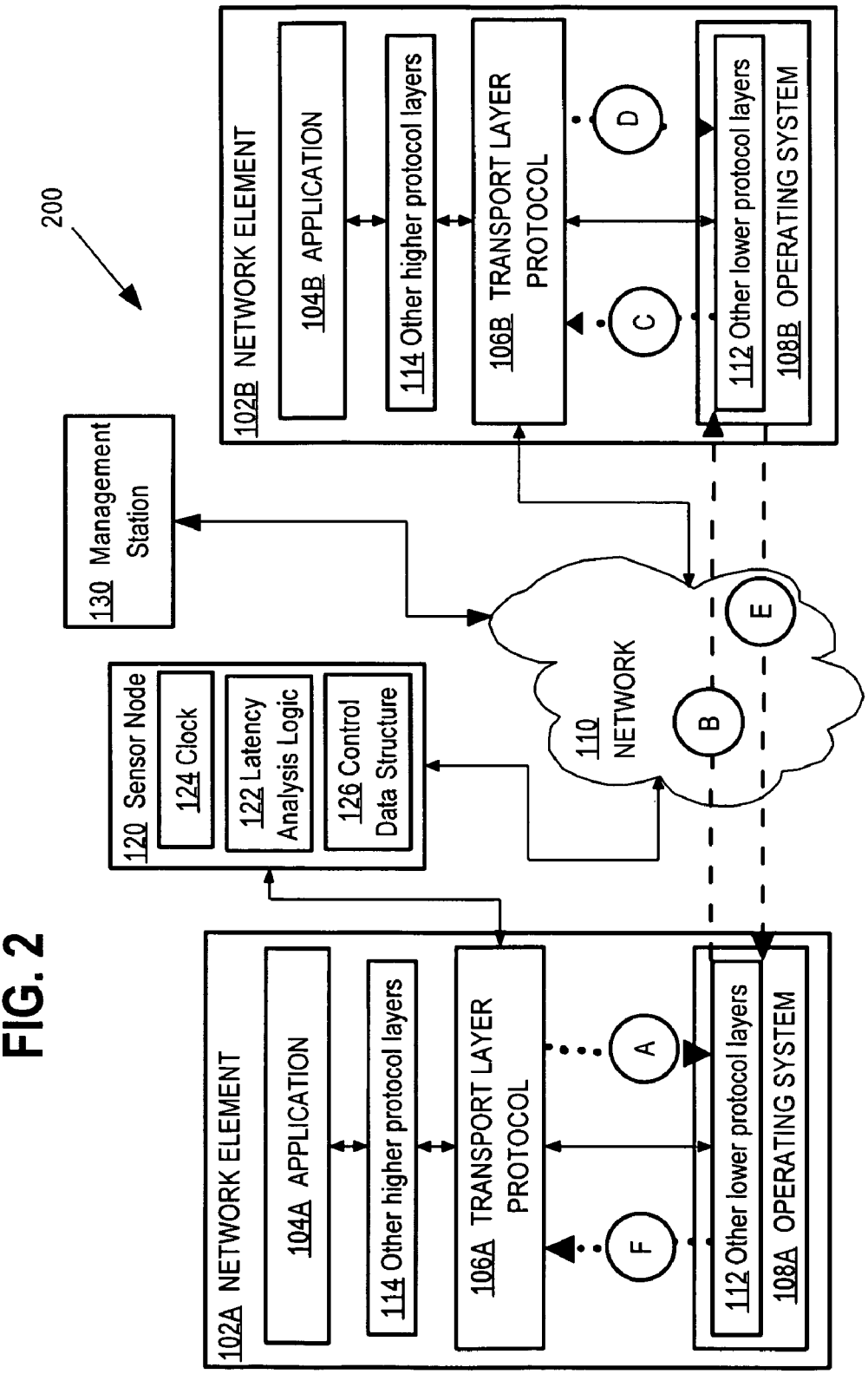
FIG. 2 is a block diagram of an example network arrangement in which an embodiment can be used, and illustrating flow paths of transport-layer segments.

First network element 102A hosts an operating system 108A, a transport layer protocol 106A, and an application 104A. Operating system 108A supervises input/output functions and may implement network-layer protocols. Transport layer protocol 106A implements transport control protocol (TCP) as defined in IETF RFC 793, Stream Control Transport Protocol (SCTP), or any other protocol or software element that provides for transport layer network message communication. Application 104A broadly represents one or more software programs that use a transport layer protocol for message communications. For example, application 104A may comprise a financial services application, or an implementation of Border Gateway Protocol (BGP) as defined in IETF RFC 1771, etc. For clarity, FIG. 2 shows one block each representing application 104A, 104B, but in other embodiments network elements 102A, 102B each may host any number of applications.

Second network element 102A hosts an operating system 108B, transport layer protocol 106B, and application 104B. In this arrangement, application 104A can communicate with application 104B over a transport layer connection that is established between transport layer protocol 106A and transport layer protocol 106B. Applications 104A, 104B may be related as client and server, as peer applications, or any other suitable operational relationship.

A sensor node 120 is communicatively coupled to at least the first network element 102A and to network 110 and is logically interposed between the first network element and the second network element 102B. In this arrangement, sensor node 120 receives all network traffic that is communicated between the first network element 102A and the second network element 102B, examines or monitors the network traffic, and forwards the network traffic to the destination indicated in the traffic without modification. In certain embodiments, such operation is termed a monitor mode or "promiscuous mode." In certain embodiments, sensor node 120 comprises a packet switch that incorporates Application-Oriented Networking (AON) technology from Cisco Systems, Inc., San Jose, Calif., such as the Cisco Catalyst 6500 Series switches.

The description herein assumes that first network element 102A and the second network element 102B are connected on symmetric paths so that sensor node 120 can receive and monitor bidirectional traffic between the network elements. Because symmetric links are widely used in enterprise networks, the approach herein has wide applicability. Network arrangements that use asymmetrical links, such as satellite networks, are outside the scope of this description.

In the arrangement of FIG. 1, according to an embodiment, sensor node 120 is configured to use the TCP timestamp option to measure application-level or socket-level delay as experienced by network element 102A as an endpoint in a TCP connection. The delay is estimated by monitoring traffic between the endpoints, namely network elements 102A, 102B.

No changes or software agents are required at the endpoints. The approach can report the end-to-end delay to an external observer node, management station, monitoring entity, etc., in real time. While the TCP stack or TCP module at an endpoint of the communication can gather information about delay characteristics, management applications and entities normally cannot receive such delay information, since the delay information is not available outside of the TCP layer. Using the approach herein, management entities become aware of delays occurring at the TCP layer. Further, the delay information received at the management entities is the same as latency observed at the TCP layer of an endpoint, even though the delay information is actually derived outside of the endpoint.

Figure 3:
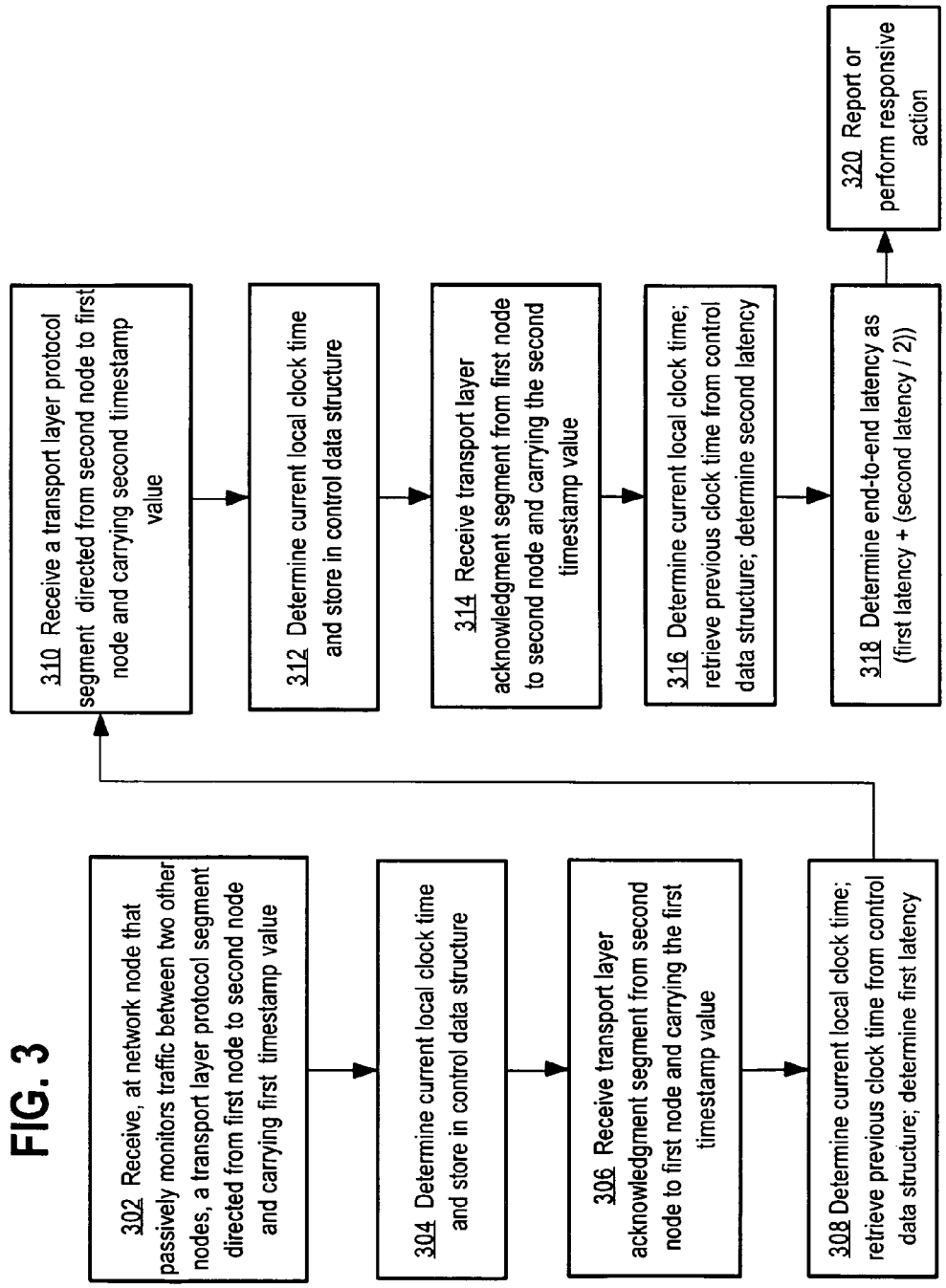
FIG. 3 is a flow diagram of an example embodiment of a method of determining application-level network latency by monitoring option values in a transport layer message.

3.0 Determining Application-Level Network Latency by Monitoring Option Values in a Transport Layer Message FIG. 2 is a block diagram of an example network arrangement in which an embodiment can be used, and illustrating flow paths of transport-layer segments. FIG. 3 is a flow diagram of an example embodiment of a method of determining application-level network latency by monitoring option values in a transport layer message.

Referring first to FIG. 2, a system 200 comprises a first network element 102A, second network element 102B, and sensor node 120 as in FIG. 1. Further, a management station 130 is coupled to network 110. Management station 130 broadly represents any form of network management entity, including a software application, console, station, etc. An example of management station 130 is a workstation hosting CiscoWorks Campus Manager, commercially available from Cisco Systems, Inc., San Jose, Calif.

Network elements 102A, 102B each include one or more other higher protocol layers 114 that are logically interposed between transport layer protocol 106A and application 104A. Higher protocol layers 114 may comprise an implementation of a network stack including session management and related functions. Network elements 102A, 102B also each include one or more other lower protocol layers 112, such as an implementation of a network-layer protocol such as Internet Protocol. Lower protocol layers 112 may be integrated into operating system 108A or may comprise a separate element that is hosted by the operating system.

Sensor node 120 comprises a local clock 124, latency analysis logic 122, and control data structure 126. Local clock 124 is any form of time reference provided in hardware or software in sensor node 120. Latency analysis logic 122 comprises one or more computer programs, methods, or other software elements that implement the functions of FIG. 3 and other functions described herein.

Control data structure 126 temporarily stores timestamp values and timestamp echo values that sensor node 120 observes in bidirectional traffic among network elements 102A, 102B. The control data structure 126 may comprise a programmatic variable, a complex data structure in memory, a MIB, etc. In one embodiment, control data structure 126 is a promiscuous transport control block (TCB) that sensor node maintains for a transport layer connection that the sensor node is observing. Various embodiments may use any other convenient form of data storage that can temporarily hold timestamp values. Various embodiments also may store a port value or port number associated with a monitored application, such as application 104A, to enable the sensor node and management station to distinguish among segments communicated by different applications.

In FIG. 3, dashed lines labeled with circled letters represent communication paths, traversed by packets moving from first network element 102A to second network element 102B, and which contribute to packet delay or latency between the network elements. For communication between first network element 102A and second network element 102B, a total round-trip delay value consists of the sum of individual delay on paths A, B, C, D, E, and F. Further, the sum of such paths yields a latency value that includes delay contributed by applications 104A, 104B and the other higher protocol layers 114.

Among the paths, A represents delay down the network stack of the first network element 102A until a packet reaches the network; B represents network latency until the packet reaches an interface of second network element 102B; C represents delay up the stack of second network element 102B until the packet is processed by transport layer protocol 106B; D represents delay down the network stack of second network element 102B until the packet reaches the network; E represents network latency until the packet reaches an interface of first network element 102A; F represents delay up the stack of the first network element 102A until the packet is processed by transport layer protocol 106A.

Sensor node 120 is operating in a promiscuous mode and is preferably located adjacent to first network element 102A. Alternatively the sensor node is located adjacent to the other network element 102B or any other one end point of communication. A typical location for sensor node 120 is on the same access switch and same VLAN (virtual local area network) as first network element 102A. Thus, for example, sensor node 120 may be hosted on a switch, or may comprise a switch. Further, in an embodiment, transport layer protocols 106A, 106B implement TCP or comprise TCP modules, and both first network element 102A and second network element 102B are configured to use the TCP timestamp option of RFC 1323.

Referring now to FIG. 3, an example embodiment of a method of determining application-level network latency by monitoring option values in a transport layer message is now described. For purposes of illustrating a clear example, FIG. 3 is described with reference to FIG. 2. However, the broad approach of FIG. 3 may be practiced in connection with network arrangements other than as specifically shown in FIG. 2.

At network element 102A, application 104A generates a protocol data unit (PDU) that is destined for application 104B of network element 102B. Application 104A provides the PDU to transport layer protocol 106A. The transport layer protocol 106A constructs and sends a data segment carrying the PDU, having the timestamp option set, carrying a first timestamp value, and having an arbitrary timestamp echo value. For conciseness, in this description a timestamp value is denoted TSval, and a timestamp echo value is denoted TSecr. Thus the first timestamp value is TSval=n1, and the arbitrary timestamp echo value is TSecr=xyz.

At step 302, at a network node that passively monitors traffic between two other nodes, a transport layer protocol segment is received that is directed from the first node to the second node and carrying the first timestamp value. Thus, the above described segment with TSval=n1 and TSecr=xyz is received at sensor node 120.

Upon receiving such a segment, at step 304 the current local clock time is determined and stored in a control data structure. For example, sensor node 120 stores TSval=n1 and the then-current value of clock 124 (denoted "my_n1" herein for convenience) in the control data structure 126.

At step 306, a transport layer acknowledgment segment is received from the second node to the first node and carrying the first timestamp value. For example, sensor node 120 monitors bidirectional traffic between network elements 102A, 102B; when the sensor node receives and identifies a segment directed from network element 102B to network element 102A and having the ACK bit set and having TSecr=n1, responsive action is taken.

In step 308, the local clock time is again determined; the previous clock time is retrieved from the control data structure; and a first latency value is determined. For example, sensor node 120 observes its current time=my_n1+delta. Sensor node 120 retrieves the value "my_n1" from the control structure 126, and calculates the difference "delta" with respect to the then-current local time. The delta value is equal to a latency period of the sum of path segments B+C+D+E of FIG. 2. Because a local clock is used as a time reference and the actual value of the TSval field is ignored, clock synchronization is unnecessary.

However, such a first latency value does not represent end-to-end latency for the nodes. Determining the latency due to path segment A and F is necessary.

In an embodiment, sensor node 120 observes traffic from network element 102B to network element 102A. For example, at step 310, sensor node 120 receives a transport layer protocol segment directed from the second node to the first node and carrying a second timestamp value. Thus, sensor node 120 observes TSval=n2 in a segment from network element 102B to network element 102A.

In response, at step 312, the then-current local clock time is determined and stored in the control data structure. For example, sensor node 120 stores the value TSval=n2 and the local time "my_n2" in the control structure 126.

The sensor node continues observing traffic until an acknowledgement segment is received. At step 314, a transport layer acknowledgment segment is received from the first node directed to the second node and carrying the second timestamp value. Thus, in a segment from network element 102A to network element 102B, if the ACK bit is set and TSecr=n2, then sensor node 120 takes responsive action.

At step 316, the then-current local time is determined; the previous clock time is retrieved from the control data structure; and a second latency value is determined. For example, sensor node 120 determines the then-current local time, which is my_n2+delta2. Sensor node 120 retrieves the local time that was saved in control structure 126 when TSval=n2 was observed, and determines the difference to yield "delta2." The value "delta2" is the time for a packet to traverse up the stack of the first network element 102A on path F of FIG. 2 and to be sent down the stack to the network on path F of FIG. 2. Thus, delta2=2*F.

In step 318, the end-to-end latency for the network elements and the network is determined as the sum of the first latency and the second latency. The end-to-end latency is thus (delta+delta2), and corresponds to the RTT (A+B+C+D+E+F) as measured by transport layer protocol 106A of first network element 102A. The end-to-end latency value also accurately reflects the total network latency experienced by an application 104A running on transport layer protocol 106A.

At step 320, the end-to-end latency value is reported to an external node, or other responsive action is taken. For example, at step 320 the sensor node 120 creates and sends the management station 130 a message containing the end-to-end latency value.

Accordingly, the approach herein efficiently uses the TCP timestamp option, or any other transport layer protocol field that carries a timestamp, label, or signature that is sent and echoed or acknowledged, to derive an accurate estimate of application level network and stack latency.

Optionally, a port value or port number of application 104A is also stored in control structure 126, which enables sensor node 120 and management station 130 to distinguish between different applications that are concurrently hosted at first network element 102A and that concurrently use the same transport layer protocol 106A for network communications. In this embodiment, steps 302, 304 may involve determining a port value or port number that is carried in a segment header of the received segment and storing a triple (TSVal, my_time, application port number) in the control structure 126.

In still another alternative, steps 302, 304 involve determining and storing in the control structure 126 the 5-tuple of values that identify a distinct transport layer flow, including source network address, source port number, destination network address, destination port number, and protocol. At the end of the process of FIG. 3, such information may be reported to management station 130. As a result, management station 130 can correlate multiple reports into a client-server application-level session to give a fuller view of application performance and to help isolate where performance problems exist (e.g., at the client, the application server, or the network). In such embodiments, the server port may be associated with a well-known application. From the final latency value, logic in management station 130 or sensor node 120 can infer the application level latency or performance.

In yet another alternative, sensor node 120 hosts a simple network management protocol (SNMP) agent and is managed using SNMP, and hosts a latency MIB (management information base). In one embodiment, the latency MIB stores finally determined end-to-end latency values in association with port and flow information. This alternative has the advantage of maintaining latency-related data in a location other than the TCB or control structure 126, while allowing a management application at management station 130 to rapidly query and obtain the latency-related data on demand. Alternatively, such latency-related data may be stored in a table of another MIB that gives a snapshot of observed delays on a per segment basis, or at certain intervals.

The resulting data can be used, in real time as latency problems occur, to take proactive steps to mitigate the latency issue or reprogram the network fabric. For example, a user of management station 130 may elect to change a QoS configuration for a particular flow, end host, etc.

Unlike past practice in which TCP timestamps are evaluated only at the transport layer level, the approach herein yields an application-level end-to-end latency value that includes any delay contributed by applications 104A, 104B and the other higher protocol layers 114. This result occurs because sensor node 120 receives a first segment only after application 104A has created the segment, the segment has passed through the higher protocol layers 114, the segment has passed through transport layer protocol 106A to the network on path A. Further, sensor node 120 receives an acknowledgment segment on path E only after the original segment traversed paths B and C, and passed the higher protocol layers 114 of second network element 102B, was processed by application 104B, and was sent back down the entire stack including layers 114, transport layer protocol 106B, and path D.

The approach herein does not require active probing of network elements, or modification of end hosts. Embodiments use, for a purpose other than originally intended, the timestamp option of TCP or another protocol. The approach herein does not alter the traffic that passes through the sensor node en route to a destination endpoint. The approach does not inject additional traffic, such as probe packets or others, into the network. The approach can measure the latency for a specific application, not the coarse node-to-node latency, and can update or notify the monitoring station in real time, as traffic is observed and the latency values are determined.

The technical paper "RTT.pdf" on the World Wide Web in the domain and folder maurol.com.ar/security describes an active probe approach for determining packet round trip time. However, that paper describes an active probe mechanism, in which a probe packet is issued from the client to determine the round-trip time. The probe is active in the sense that the probe emulates the client, and thus the probe has to be aware of the protocol formats. Probing is not always possible in a network, as there may be no access to client machine for instance. Probing also is sometimes considered harmful because it creates extra bandwidth, spurious packets, and triggers intrusion detection systems.

In contrast, the approach herein provides a monitor and not a probe. Prior visibility and monitoring solutions rely on passively intercepting the packets and not active probing, which degrades host and network performance and distorts results. The approach herein is applied in a context that monitors the network, in real-time and without disturbing the end hosts or the application traffic being monitored. Further, while the TCP timestamp option has existed since 1992, no prior description proposes using the TCP timestamp passively to determine round-trip delay. The approach herein further proposes that TCP-level round-trip delay can be used to infer application-layer latency.

4.0 Implementation Mechanisms—Hardware Overview

Figure 4:
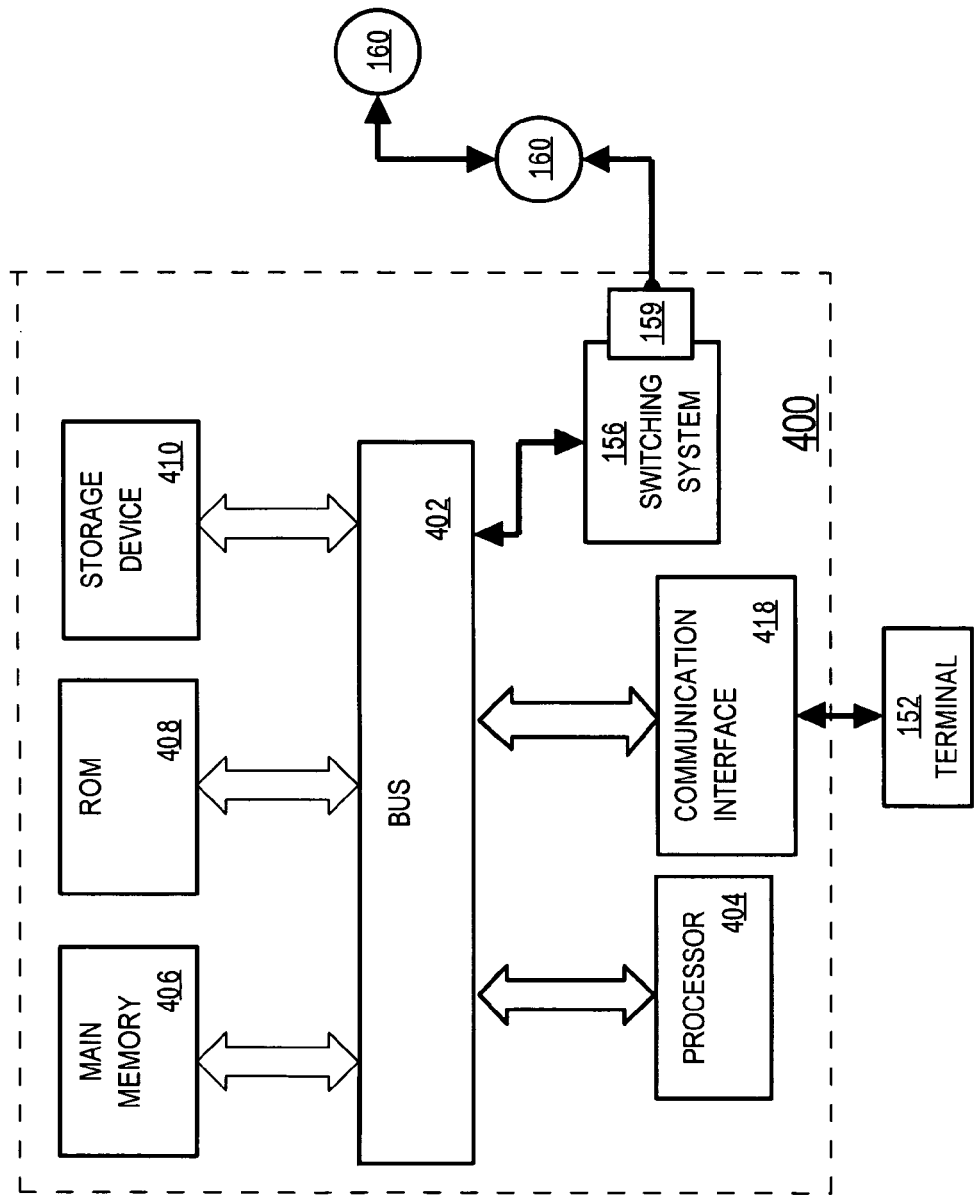
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for determining application-level network latency by monitoring option values in a transport layer message. According to one embodiment of the invention, determining application-level network latency by monitoring option values in a transport layer message is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for determining application-level network latency by monitoring option values in a transport layer message as described herein.

Processor 404 may execute the received code as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
 a network interface that is configured to be coupled between a first network node and a second network node, and in parallel with a data network for receiving one or more packet flows that are communicated between the first network node and the second network node;
 a processor coupled to the network interface;
 a clock coupled to the processor;
 latency analysis logic coupled to the processor and comprising one or more stored sequences of instructions which, when executed by the processor, cause the processor to perform:
  receiving a first data segment that has been generated by a first application hosted on an application layer protocol and communicated from a transport layer protocol of the first node, and forwarding the first data segment to the second node;
  storing a first time value of the clock in association with a first timestamp value obtained from the first data segment;
  wherein the first time value corresponds to a time when the first data segment was received by the network interface;
  receiving a second data segment that has been generated by a second application hosted on the application layer protocol of the second node and communicated from the transport layer protocol of the second node in response to receiving the first data segment by the second application hosted on the application layer protocol of the second node, and forwarding the second data segment to the first node;
  retrieving the first time value based on the first timestamp value;
  determining a second time value of the clock;
  wherein the second time value corresponds to a time when the second data segment was received by the network interface;
 determining a first latency value by computing a difference of the second time value and the first time value;
 receiving a third data segment that has been generated by the second application hosted on the application layer protocol of the second node and communicated from the transport layer protocol of the second node, and forwarding the third data segment to the first node;
 storing a third time value of the clock in association with a third timestamp value obtained from the third data segment;
 wherein the third time value corresponds to a time when the third data segment was received by the network interface;
 receiving a fourth data segment that has been generated by the first application hosted on the application layer protocol of the first node and communicated from the transport layer protocol of the first node in response to receiving the third data segment by the first application hosted on the application layer protocol of the first node;
 retrieving the third time value based on the third timestamp value;
 determining a fourth time value of the clock;
 wherein the fourth time value corresponds to a time when the fourth data segment was received by the network interface;
 determining a second latency value by computing a difference of the fourth time value and the third time value;
 determining an end-to-end latency value as: (first latency value+second latency value/2).

2. The apparatus of claim 1, wherein the apparatus is logically located in a local area network (LAN) segment that contains the first node.

3. The apparatus of claim 1, wherein the data segments are transport control protocol (TCP) data segments, and wherein the timestamp values are in TCP timestamp option fields.

4. The apparatus of claim 3, wherein the second data segment comprises a TCP acknowledgment bit set and a timestamp echo reply (TSecr) value equal to the first timestamp value.

5. The apparatus of claim 1, wherein the latency analysis logic does not alter the first data segment or the second data segment.

6. The apparatus of claim 1, wherein the latency analysis logic comprises further sequences of instructions which, when executed by the processor, cause the processor to perform reporting any of the first latency value, the second latency value, and the end-to-end latency value to a network management element while the first node and the second node communicate subsequent data segments.

7. The apparatus of claim 1, wherein the apparatus is logically located on a network access switch that services the first node and wherein the apparatus is logically located within a VLAN that contains the first node.

8. An apparatus, comprising:
a network interface that is configured to be coupled between a first network node and a second network node, and in parallel with a data network for receiving one or more packet flows that are communicated between the first network node and the second network node;
a processor coupled to the network interface;
a clock coupled to the processor;
means for receiving a first data segment that has been generated by a first application hosted on a an application layer protocol and communicated from a transport layer protocol of the first node, and forwarding the first data segment to the second node;
means for storing a first time value of the clock in association with a first timestamp value obtained from the first data segment; wherein the first time value corresponds to a time when the first data segment was received by the network interface;
means for receiving a second data segment that has been generated by a second application hosted on the application layer protocol of the second node and communicated from the transport layer protocol of the second node in response to receiving the first data segment by the second application hosted on the application layer protocol of the second node, and forwarding the second data segment to the first node;
means for retrieving the first time value based on the first timestamp value;
means for determining a second time value of the clock; wherein the second time value corresponds to a time when the second data segment was received by the network interface;
means for determining a first latency value by computing a difference of the second time value and the first time value;
means for receiving a third data segment that has been communicated from the second node to the first node;
means for storing a third time value of the clock in association with a third timestamp value obtained from the third data segment; wherein the third time value corresponds to a time when the third data segment was received by the network interface;
means for receiving a fourth data segment that has been generated by the first application hosted on the application layer protocol of the first node and communicated from the transport layer protocol of the first node in response to receiving the third data segment by the first application hosted on the application layer protocol of the first node;
means for retrieving the third time value based on the third timestamp value;
means for determining a fourth time value of the clock; wherein the fourth time value corresponds to a time when the fourth data segment was received by the network interface;
means for determining a second latency value by computing a difference of the fourth time value and the third time value;
means for determining an end-to-end latency value as: (first latency value+second latency value)/2.

9. The apparatus of claim 8, wherein the apparatus is logically located in a local area network (LAN) segment that contains the first node.

10. The apparatus of claim 8, wherein the data segments are transport control protocol (TCP) data segments, and wherein the timestamp values are in TCP timestamp option fields.

11. The apparatus of claim 10, wherein the second data segment comprises a TCP acknowledgment bit set and a timestamp echo reply (TSecr) value equal to the first timestamp value.

12. The apparatus of claim 8, wherein the receiving means does not alter the first data segment or the second data segment.

13. The apparatus of claim 8, further comprising means for reporting any of the first latency value, the second latency value, and the end-to-end latency value to a network management element while the first node and the second node communicate subsequent data segments.

14. The apparatus of claim 8, wherein the apparatus is logically located on a network access switch that services the first node and wherein the apparatus is logically located within a VLAN that contains the first node.

15. A packet data router, comprising:
one or more network interfaces that are configured to be communicatively coupled between a first network node and a second network node, and in parallel with a data network for receiving one or more packet flows that are communicated between the first network node and the second network node;
one or more processors coupled to the network interfaces;
a clock coupled to the one or more processors;
a computer-readable volatile or non-volatile storage medium comprising one or more stored sequences of instructions which, when executed by the one or more processors, cause the one or more processors to perform:
receiving a first data segment that has been generated by a first application hosted on an application layer protocol and communicated from a transport layer protocol of the first node and forwarding the first data segment to the second node;
storing a first time value of the clock in association with a first timestamp value obtained from the first data segment;
wherein the first time value corresponds to a time when the first data segment was received by the network interface;
receiving a second data segment that has been generated by a second application hosted on the application layer protocol of the second node and communicated from the transport layer protocol of the second node in response to receiving the first data segment by the second application hosted on the application layer protocol of the second node, wherein the second data segment comprises an acknowledgement of the first data segment and an echo of the first timestamp value;

retrieving the first time value based on the first timestamp value;

determining a second time value of the clock;

wherein the second time value corresponds to a time when the second data segment was received by the network interface;

determining a first latency value by computing a difference of the second time value and the first time value;

receiving a third data segment that has been generated by the second application hosted on the application layer protocol of the second node and communicated from the transport layer protocol of the second node, and forwarding the third data segment to the first node;

storing a third time value of the clock in association with a third timestamp value obtained from the third data segment;

wherein the third time value corresponds to a time when the third data segment was received by the network interface;

receiving a fourth data segment that has been generated by the first application hosted on the application layer protocol of the first node and communicated from the transport layer protocol of the first node in response to receiving the third data segment by the first application hosted on the application layer protocol of the first node, wherein the fourth data segment comprises an acknowledgement of the third data segment and an echo of the third timestamp value;

retrieving the third time value based on the third timestamp value;

determining a fourth time value of the clock;

wherein the fourth time value corresponds to a time when the fourth data segment was received by the network interface;

determining a second latency value by computing a difference of the fourth time value and the third time value;

determining an end-to-end latency value as: (first latency value+second latency value/2).

16. The apparatus of claim 15, wherein the data segments are transport control protocol (TCP) data segments, and wherein the timestamp values are in TCP timestamp option fields.

17. The apparatus of claim 16, wherein the second data segment comprises a TCP acknowledgment bit set and a timestamp echo reply (TSecr) value equal to the first timestamp value.

18. The apparatus of claim 15, wherein the latency analysis logic does not alter the first data segment or the second data segment.

19. The apparatus of claim 15, wherein the apparatus is logically located on a network access switch that services the first node and wherein the apparatus is logically located within a VLAN that contains the first node.

20. A machine-implemented method comprising:

receiving a first data segment that has been generated by first application hosted on a an application layer protocol and communicated from a transport layer protocol of a first node and forwarding the first data segment to a second node, wherein the first data segment is received at a third node that is logically located in a network between the first node and the second node and in parallel with a path between the first node and the second node, wherein the third node maintains a local clock;

storing a first time value of the local clock in association with a first timestamp value obtained from the first data segment;

receiving a second data segment that has been generated by a second application hosted on the application layer protocol of the second node and communicated from the transport layer protocol of the second node to the first node in response to receiving the first data segment by the second application hosted on the application layer protocol of the second node;

retrieving the first time value based on the first timestamp value;

determining a second time value of the local clock;

wherein the second time value corresponds to a time when the second data segments was received by the third node;

determining a first latency value by computing a difference of the second time value and the first time value;

receiving a third data segment that has been generated by the second application hosted on the application layer protocol of the second node and communicated from the transport layer protocol of the second node, and forwarding the third data segment to the first node;

storing a third time value of the local clock in association with a third timestamp value obtained from the third data segment;

wherein the third time value corresponds to a time when the third data segment was received by the third node;

receiving a fourth data segment that has been generated by the first application hosted on the application layer protocol of the first node and communicated from the transport layer protocol of the first node in response to receiving the third data segment by the first application hosted on the application layer protocol of the first node;

retrieving the third time value based on the third timestamp value;

determining a fourth time value of the local clock;

wherein the fourth time value corresponds to a time when the fourth data segment was received by the third node;

determining a second latency value by computing a difference of the fourth time value and the third time value;

determining an end-to-end latency value as: (first latency value+second latency value/2);

wherein the method is performed by one or more processors.

21. A machine-implemented method as recited in claim 20, wherein the data segments are transport control protocol (TCP) data segments.

22. A machine-implemented method as recited in claim 20, wherein the third node reports any of the first latency value, the second latency value, and the end-to-end latency value to a network management element while the first node and the second node communicate subsequent data segments.

23. A non-transitory computer-readable tangible volatile or non-volatile storage medium comprising one or more stored sequences of instructions which, when executed by one or more processors, cause the one or more processors to perform:

receiving a first data segment that has been generated by a first application hosted on an application layer protocol and communicated from a transport layer protocol of a first node and forwarding the first data segment to a second node, wherein the first data segment is received at a third node that is logically located in a network between the first node and the second node and in parallel with a path between the first node and the second node, wherein the third node maintains a local clock;

storing a first time value of the local clock in association with a first timestamp value obtained from the first data segment;

wherein the first time value corresponds to a time when the first data segment was received by the third node;

at the third node, receiving a second data segment that has been generated by a second application hosted on the application layer protocol of the second node and communicated from the transport layer protocol of the second node in response to receiving the first data segment by the second application hosted on the application layer protocol of the second node;

retrieving the first time value based on the first timestamp value;

determining a second time value of the local clock;

wherein the second time value corresponds to a time when the second data segments was received by the third node;

determining a first latency value by computing a difference of the second time value and the first time value;

receiving a third data segment that has been generated by the second application hosted on the application layer protocol of the second node and communicated from the transport layer protocol of the second node, and forwarding the third data segment to the first node;

storing a third time value of the local clock in association with a third timestamp value obtained from the third data segment;

wherein the third time value corresponds to a time when the third data segment was received by the third node;

receiving a fourth data segment that has been generated by the first application hosted on the application layer protocol of the first node and communicated from the transport layer protocol of the first node in response to receiving the third data segment by the first application hosted on the application layer protocol of the first node;

retrieving the third time value based on the third timestamp value;

determining a fourth time value of the local clock;

wherein the fourth time value corresponds to a time when the fourth data segment was received by the third node;

determining a second latency value by computing a difference of the fourth time value and the third time value;

determining an end-to-end latency value as: (first latency value +second latency value/2).

24. The non-transitory computer-readable medium of claim 23, wherein the data segments are transport control protocol (TCP) data segments.

25. The non-transitory computer-readable medium of claim 23, wherein the third node reports any of the first latency value, the second latency value, and the end-to-end latency value to a network management element while the first node and the second node communicate subsequent data segments.

* * * * *